United States Patent [19]
Mack

[11] Patent Number: 5,764,338
[45] Date of Patent: Jun. 9, 1998

[54] HOLDER FOR A MASK OR THE LIKE

[76] Inventor: Carol Anne Mack, R.R. #1, Norfolk Rd., Winsted, Conn. 06098

[21] Appl. No.: 679,460

[22] Filed: Jul. 9, 1996

[51] Int. Cl.⁶ .................. G02C 1/00; G02C 11/02; G02C 9/00
[52] U.S. Cl. ................. 351/158; 351/47; 351/52
[58] Field of Search .................. 351/44, 47, 51, 351/52, 158; 2/15, 10, 443, 450

[56] References Cited

U.S. PATENT DOCUMENTS

| | | | |
|---|---|---|---|
| 3,597,052 | 8/1971 | Dittman | 351/47 |
| 3,798,712 | 3/1974 | Bonis | 351/158 |
| 3,991,753 | 11/1976 | Viesca y Viesca | 128/146.2 |
| 4,821,340 | 4/1989 | Johnson | 351/158 |
| 4,968,128 | 11/1990 | Mendola | 351/52 |
| 5,497,211 | 3/1996 | McNulty | 351/52 |

*Primary Examiner*—Huy Mai
*Attorney, Agent, or Firm*—William C. Crutcher

[57] ABSTRACT

A clip comprising a flexible plastic channel member with attachment device, such as a double sided adhesive pad on one wall of the channel, fits over the top frame of eyeglasses. Used singly, or in pairs, the clips serve to hold various objects in proximity to the face, such as a mask, a visor, a light filter or a display card with a greeting. When used in pairs the adhesive or the clips allow accurate placement and holding of a mask so that the eye openings are aligned with the eyes of the wearer.

20 Claims, 5 Drawing Sheets

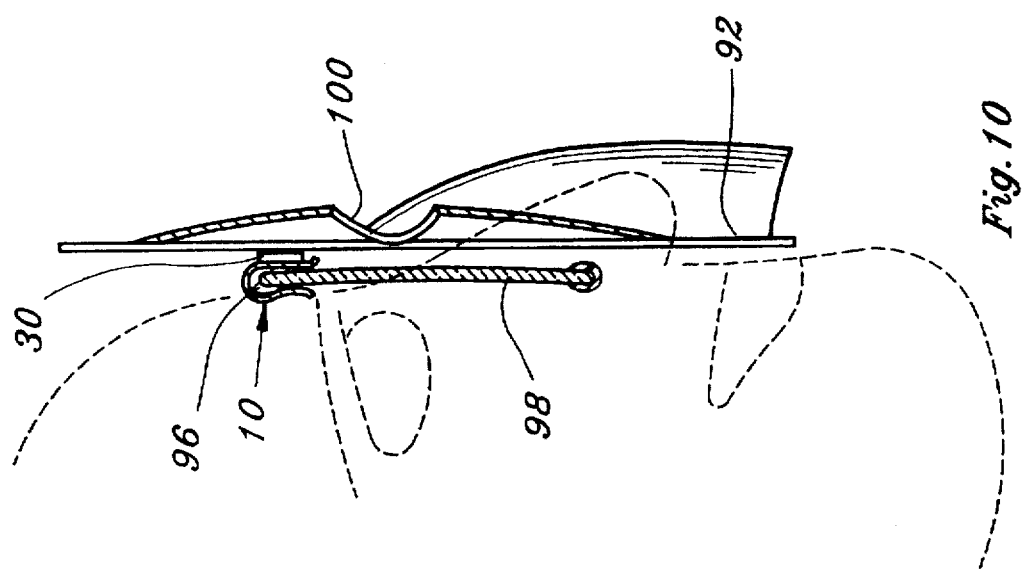
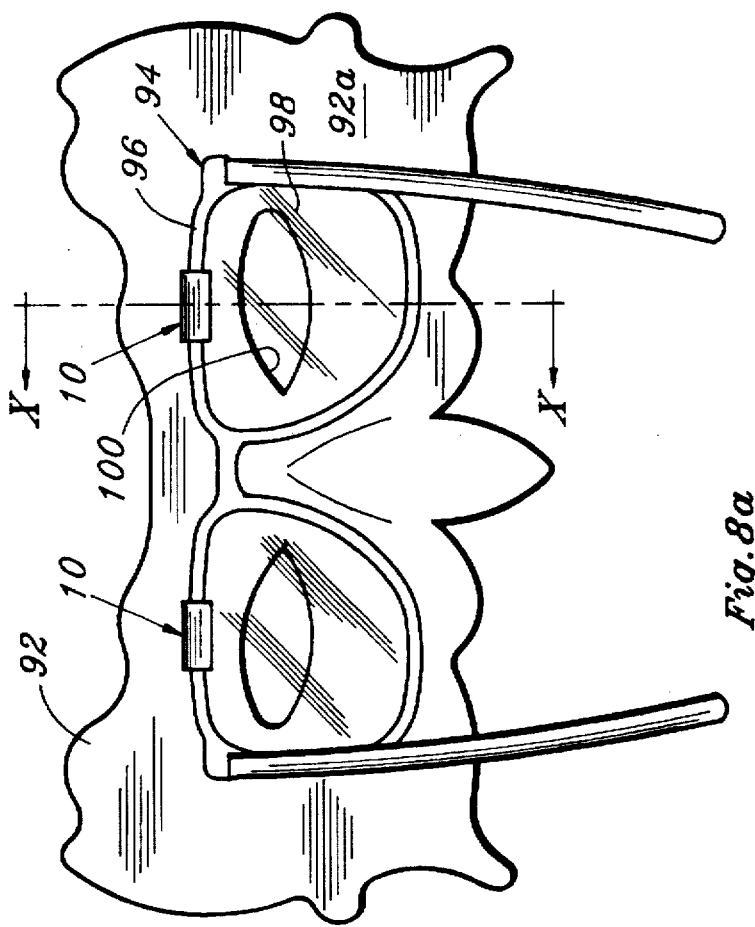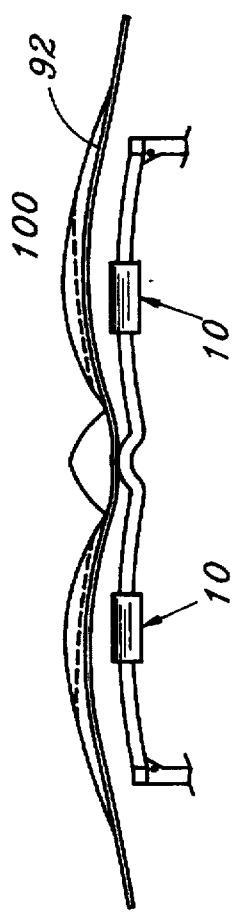

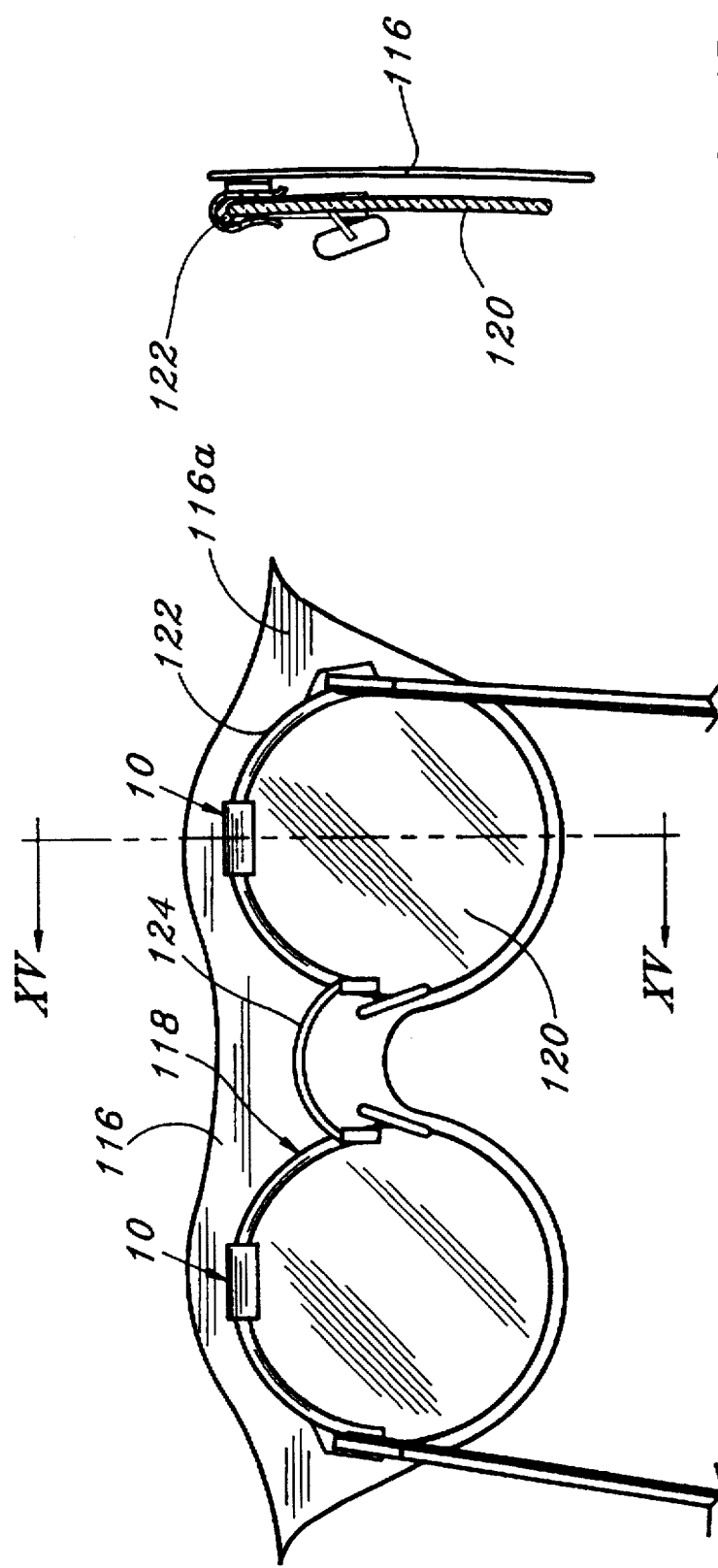

5,764,338

HOLDER FOR A MASK OR THE LIKE

BACKGROUND OF THE INVENTION

This invention relates generally to devices for holding objects in proximity to the face, such as a mask. More particularly, the invention relates to an accessory for eyeglasses, adapted to hold a variety of objects in proximity to the face, such as a mask, visor, light filter, or display card.

Traditionally, face masks are held in place by elastic cords attached to the sides of the mask and stretched around the head of the wearer. These are cumbersome and uncomfortable when the wearer is also wearing eyeglasses, and sometimes unusable if the wearer wishes also to wear a hat or a cap. If the mask is very large, such as those used in Mardi Gras festivals, it is difficult to locate and hold it properly in relation to the eyes of the wearer, particularly if the wearer also wears eyeglasses. Other types of masks have also utilized elastic cords, such as surgical masks, air filtering masks and eye protecting masks.

Devices have been proposed in the prior art for utilizing spectacles or eyeglass frames as the medium for supporting objects to be held in close proximity with the face of the wearer. For example, in U.S. Pat. No. 3,991,753 issued Nov. 16, 1976 to Viesca, a surgical mask designed to be held over the nose, eyes and mouth of the wearer, is transparent, and is suspended from the frames of eyeglasses by means of wire clips which are permanently attached to the mask by screws. The clips are made of elastic stainless steel wire, which is apt to scratch the lens, and are not provided with any adjustments.

A similar device is shown in U.S. Pat. No. 4,821,340 issued Apr. 18, 1989 to Johnson, in which a dental face shield is adapted to hang from the nosepiece of a pair of eyeglasses without covering the lens, by means of a special plastic clip fitting over the nosepiece. The clip is provided with projections which fit into recessed blisters in the face shield without means for further adjusting or positioning the face shield with respect to the face of the wearer. Eyeglasses have also been utilized to display signs, ornaments, name tags or other items in proximity to the face for attracting attention. Two such attachments are shown in U.S. Pat. No. 5,497,211 issued Mar. 5, 1996 to McNulty in which a small display pennant having indicia thereon is held on the templepiece of a pair of eyeglasses. Also U.S. Pat. No. 4,968,128 issued Nov. 6, 1990 to Mendola describes attachment devices for snapping around the templepiece of eyeglasses to hold ornaments or the like.

There are a number of well-known constructions for providing temporary light filters for eyeglasses by clipping frames with darkened lenses onto eyeglasses, thereby converting them into sunglasses. It is also known that visors for shading the eyes from the sun can be attached to headbands or caps or, in some cases, provided with integral templepieces to hold the visors in place.

Accordingly, one object of the present invention is to provide an improved device for positioning and holding an object in close proximity to the face of a wearer of eyeglasses.

Another object of the invention is to provide an improved device for positioning and holding masks, visors, light filters, display cards and the like.

Another object of the invention is to provide an improved face mask holding and positioning device which eliminates the usual elastic cords passing around the head.

SUMMARY OF THE INVENTION

Briefly stated, the invention comprises an improved device for positioning and holding an object in close proximity to the face of a wearer of eyeglasses, the eyeglasses having a pair of lens and having frame portions encasing the edges of the lens, the device comprising a channel member of flexible plastic material having a base and two spaced sidewalls extending from the base and having terminating edges, the space between the sidewalls proximal to the base having a first dimension sufficient to receive the eyeglass frame portion, the spacing between the sidewalls distal to the base being of a second dimension lesser than the thickness of the eyeglass frame portion for retaining the channel member on the eyeglass frame portion, and attachment means provided on a first one of the sidewalls and adapted for selective engagement with the object for selectively positioning and holding the object with respect to the face of the wearer. In its preferred form, the channel member is longer in the direction along the base than its height in the direction perpendicular to the base. In its preferred form, the attachment means comprises a double sided adhesive pad having one side thereof attached to the device sidewall and the other side thereof adapted for selective adhesive attachment to the object.

The device may be used singly to hold a display card or the like, but in its preferred embodiment, two devices are used in combination with an object to be held, such as a face mask with eye openings, whereby the mask may be selectively positioned so that the adhesive will hold the mask with the eye openings aligned with the eyes of the wearer.

DRAWING

Other objects and advantages of the invention will be better understood by reference to the following description, taken in connection with the accompanying drawings, in which:

FIG. 1 is a perspective view of the improved holding device in a preferred embodiment of the invention, FIG. 2 is a top plan view thereof, FIG. 3 is an end elevation view thereof, FIG. 4 is a perspective view of a modified form of the invention, FIG. 5 is a perspective view of a further modified form of the invention, FIG. 6 is a perspective view of a further modified form of the invention, FIG. 7 is a perspective view of the improved holding device of FIGS. 1, 2 and 3 in combination with a name tag and used singly, FIG. 8 is a cross sectional side elevation view through the frame and one lens of an eyeglass utilizing the modification of FIG. 5 to hold a name tag, FIG. 9 is a view similar to FIG. 8, utilizing the modification of FIG. 6 to hold a name tag, FIG. 8A is an elevational view looking from the face of a wearer toward the back of a face mask utilizing a pair of improved holding devices, FIG. 9A is a top plan view of the face mask of FIG. 8A and portions of a pair of eyeglasses, FIG. 10 is a side elevational view in cross section of the mask and eyeglasses of FIGS. 8A and 9A taken along section X—X, FIG. 11 is an elevational view looking from the face of the wearer toward a sun visor utilizing a pair of the improved holding devices, FIG. 12 is a top plan view thereof, FIG. 13 is a side elevational view in cross section taken along lines XIII—XIII of FIG. 11, FIG. 14 is an elevational view looking from the face of a wearer toward a sun screen held by a pair of eyeglasses, and FIG. 15 is a side elevational view in cross section taken along lines XV—XV of FIG. 14.

DESCRIPTION OF THE PREFERRED EMBODIMENT

Figure 1:
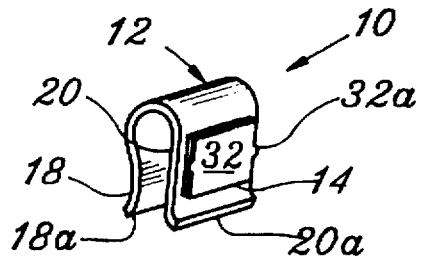
Figure 2:
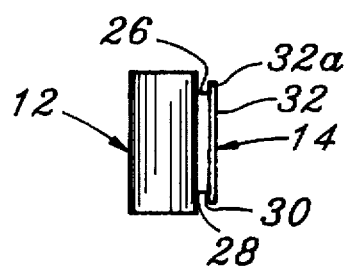
Figure 3:
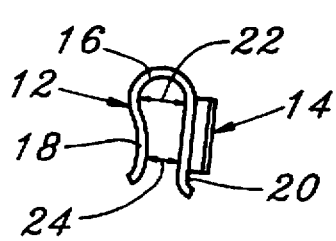

Referring to FIGS. 1, 2 and 3 of the drawing, the improved holding device 10, comprises a channel member shown generally at 12, together with attachment means shown generally at 14. Channel member 12 is preferably of a flexible plastic material such as vinyl, a widely commercially available selection of extrudable thermoplastics being suitable for the channel member 12. The main requisite is that the material be capable of holding its shape and yet being flexible and relatively soft so that it will conform to the shape of the lens and not scratch the lens of eyeglasses. In its preferred form, the channel member 12 is an extrusion, so that devices may be produced in quantity by severing or sawing a long extrusion to proper length. Channel member 12 is best seen in FIG. 3 to comprise a base 16 and two spaced sidewalls 18, 20. The length of the extrusion along base 16 in a longitudinal direction is greater than the height in a direction perpendicular to the base, a suitable ration of length to height being 3:2. The spacing between the sidewalls proximal to the base has a first dimension which is sufficient to receive the eyeglass frame portion as will be described, as indicated at reference dimension 22. The spacing between the sidewalls at a location distal to the base is of a second lesser dimension, which is less than the thickness of the eyeglass frame portion, this dimension being indicated by reference number 24. Additional holding power will be had by making the second dimension less than the lens thickness so that the channel sidewalls will grip the lens itself. As noted in FIG. 1, the spaced sidewalls 18, 20 are flared out from one another before terminating at edges 18a, 20a, in order to facilitate clipping the channel member over the frame portion.

I have found that a suitable first dimension is about ⅜" (9.6 mm) and a suitable second dimension is about 1/16" (1.6 mm), although variations are possible depending on the flexibility and strength of the plastic material. The length of channel member 12 is preferably between ½" (12.7 mm) and ¾" (19 mm) long. The preferable height is also between ⅜" and ½". A suitable ratio of length to height is 3:2.

Attachment means 14 in its preferred form comprises a double sided adhesive pad, best seen in FIG. 2 to comprise a foam substrate 26 with layers of adhesive 28, 30 on either side thereof. Such double sided adhesive pads are commercially available, one being available from 3M Company as Scotch™—Foam Tape, catalog number 114 in strips or catalog number 108 in squares. Another commercially available product is available from Parker Metal Corporation as double-faced adhesive mounting strips, catalog number 5818.

One of the adhesive layers 28 is adhered to the exterior of the side wall 20. The other adhesive layer 30 may be covered with a layer of protective film which is non-adhesive, indicated by reference numeral 32. Optional tabs 32a may be provided to assist in removing the protective layer 32 when it is time for application to an object. Alternatively the strip form of double adhesive tape may be applied to a length of channel extrusion and severed at the same time as the channel carrier is severed.

MODIFIED DEVICES

Figure 4:
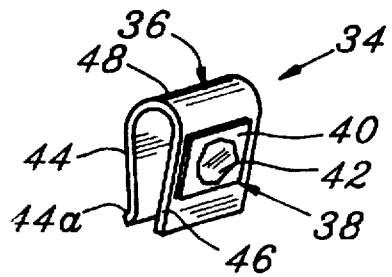

FIG. 4 illustrates a modification of the holding device shown in FIGS. 1–3. The device shown generally at 34 includes a channel member 36, and attachment means 38. Attachment means 38 consists of a layer of adhesive material 40 adhered to the sidewall with a tacky globule of adhesive putty 42 adhered to it. Two spaced side walls 44, 46 extend from a base 48. Sidewall 44 is flared out at the bottom to terminate at an edge 44a.

Figure 5:
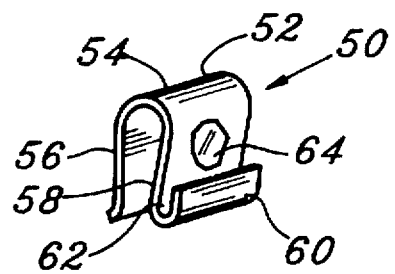

Reference to FIG. 5 illustrates a further modification shown generally as device 50. A channel member 52 includes a base 54 and two spaced sidewalls 56, 58 extending from the base 54. Sidewall 58 is curved around to provide a short flange 60, which lies in close proximity to the exterior of sidewall 58, defining a channel 62 serving as part of an attachment means. The remainder of the attachment means comprises a tacky globule of adhesive putty 64 adhered to the sidewall 58.

The tacky globule of adhesive putty shown in FIGS. 4 and 5 is commercially available from several sources. One such material is available from Paper Art Company known as Partytack™. Another suitable material is available from ITW Brands as Duco® Stick-Tak™.

Figure 6:
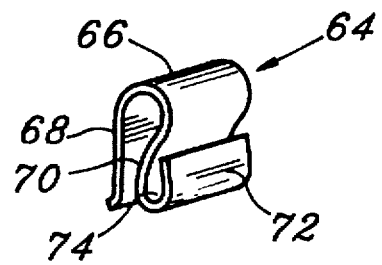

Lastly, FIG. 6 illustrates a modified holding device 64, comprising a channel member having a base 66, spaced sidewalls 68, 70, and an extension 72 of sidewall 70 which is curved around to lie in close proximity to the exterior of sidewall 70, so as to define a holding channel 74 serving as an attachment means without an adhesive.

DESCRIPTION OF PREFERRED EMBODIMENTS

Figure 7:
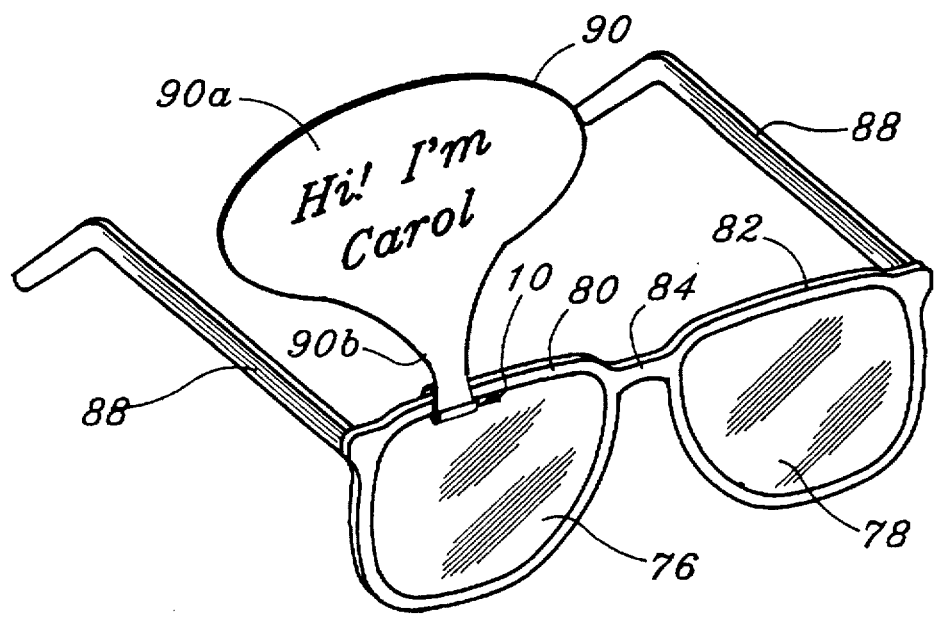

Reference to FIG. 7 illustrates a single holding device as described previously together with the held object, in this case a display card. A pair of eyeglasses is shown comprising a pair of lens 76, 78 each surrounded by respective frame portions 80, 82, joined by a central nosepiece 84 and held in place on the head of a wearer by templepieces 86, 88. The type of eyeglasses is immaterial to the present invention, it being well known that there are a variety of forms and styles of eyeglasses with different type frames and lens. The only common element that almost all styles of eyeglasses have, which is material to the present invention, is that there are a pair of lens and that there are frame portions at least passing over the top part of each of the lens and encasing at least the top part of the lens.

In FIG. 7, a preferred holding device 10 as described in FIGS. 1–3 is clipped over the frame portion 80. As described previously, the dimension 22 of channel member 16 is sufficiently large to accommodate frame portion 80, and the dimension 24 of the channel member is less than the thickness of frame portion member 80 so as to retain the holding device 10 in place. An object to be held, in this case a name tag 90 includes a surface 90a suitable for carrying indicia such as a name or a message, and having a support leg 90b. The protective film 32 has been removed, the name tag 90 positioned with respect to the wearer's face to achieve the proper effect, and the rear surface of the leg 90b is shown adhered to the adhesive film 30. In this manner, object 90 is selectively positioned and held with respect to the face of the wearer.

Figure 8:
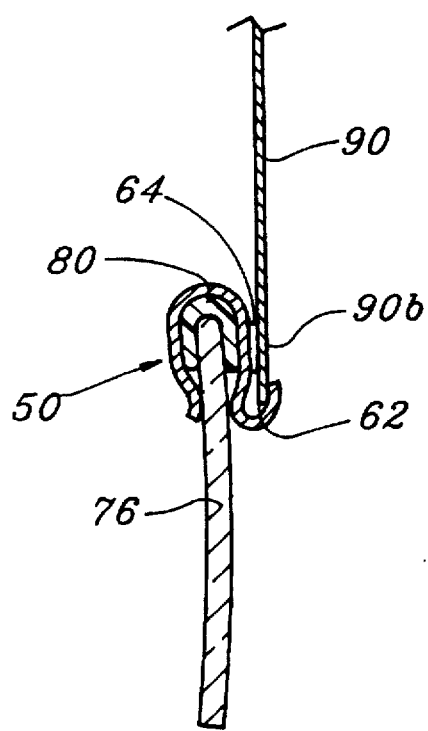
Figure 9:
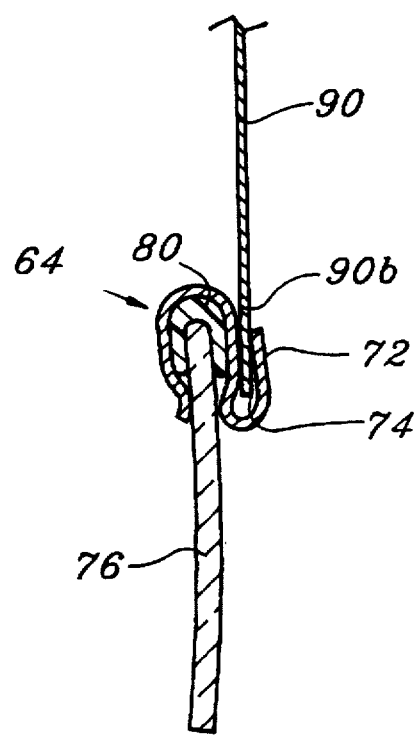

Reference to FIGS. 8 and 9 illustrate cross sections through eyeglasses such as those shown in FIG. 7, in which the lens 76 and the frame portion 80 is illustrated in cross section in both figures.

Referring first to FIG. 8, the modified holding device 50 is illustrated in cross section. The name tag 90 is engaged and held in place in the proper position by inserting the leg 90b in the holding groove 62 and then pressing it against the tacky globule of adhesive material 64.

Referring to FIG. 9, the modified holding device of 64 previously described in FIG. 6, is shown in cross section. In this case, the leg 90b is inserted in the holding channel 74 and held by the pressure of extension 72 against the sidewall.

Reference to FIGS. 8, 9 and 10 of the drawings illustrate a pair of holding devices 10 in combination with a mask 92. A pair of eyeglasses 94 include frame portions such as 96 and lens such as 98. Mask 92 includes eye openings 100, which particularly require positioning with respect to the face of the wearer of the mask 92.

FIG. 10 of the drawing illustrates a cross section through lens 98, frame portion 96 and the holding device 10 on one side of the eyeglasses, the other side being identical. Mask 92 has a rear surface 92a which is adhered to the adhesive layer 30. The mask 92 has first been carefully positioned so that the eye openings 100 are in line with the eyes of the wearer (indicated in dotted lines) and then adhered to the two holding devices 10 which have previously been placed over the frame portions 96 of the eyeglasses. While the mask is shown with the preferred holders 10, any of the modified forms shown in FIGS. 4 or 5 using an adhesive may be substituted.

Figure 13:
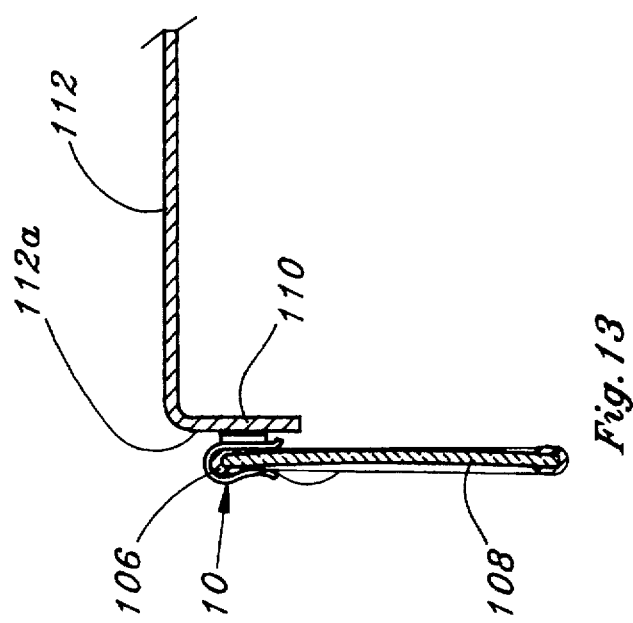
Figure 11:
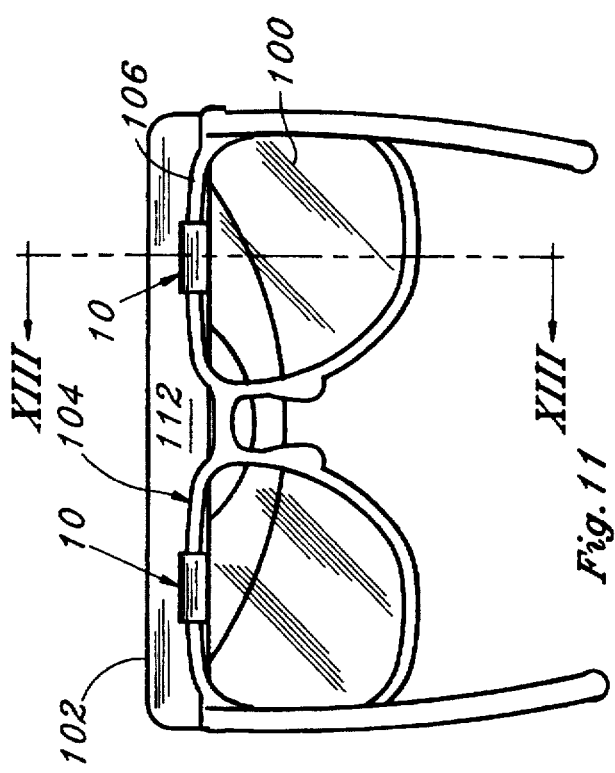
Figure 12:
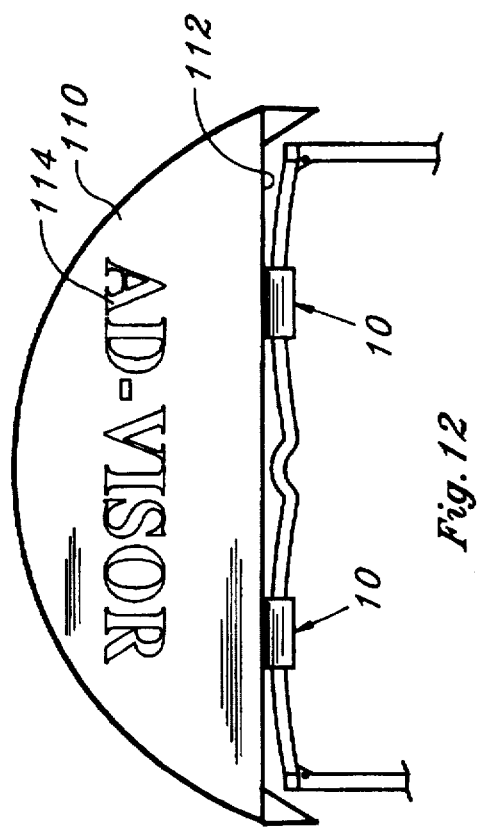

Reference to FIGS. 11, 12 and 13 illustrates a pair of holders 10 in combination with a sun visor 102. Sun visor 102 is held on a pair of eyeglasses 104 having frame portions 106 encasing a pair of lens such as 108. The visor is shown in plan view in FIG. 12 to comprise an extended visor 110 and a flange 112 facing the wearer. Flange 112 has a back surface 112a facing the wearer. The cross section view of FIG. 13 illustrates the lens 108 and frame portion 106 together with the holding device 10 in cross section. The adhesive layer of holding device 10 is attached to the back surface 112a of visor 102 after it is carefully positioned with respect to the eyes of the wearer to achieve the proper effect. The flange 112 may be constructed also as two separate tabs.

The sun visor may be made of inexpensive material such as cardboard or plastic, and may contain an advertising indicia as indicated at 114.

FIGS. 14 and 15 of the drawings illustrate the holding devices 10 in combination with a light filter 116 so as to provide a pair of sunglasses. The eyeglasses, shown at 118 are of a design having a pair of lens such as 120, each with its own frame portion 122 connected by a metal nosepiece 124 in a well-known design. The eyeglasses 118 could be used in connection with the previously described structures, as well, and vice versa. The lens 120 and frame portion 122 is indicated in cross section in FIG. 15. The light filter 116 is a piece of curved plastic treated to reduce the sun's effect on the eyes. It may be shaped in a stylistic manner as indicated by the cusps 116a. The sunscreen plastic piece 116 is positioned at the proper location in front of the eyes and then adhered to the two holding devices 10 which position it with respect to the wearer's face. Because there are no other attachments to the sheet of plastic sunscreen 116, it can be inexpensively produced and in a variety of shapes and styles. Alternatively, it can be cut from a sheet of darkened or colored plastic to suit the wearer's own taste in eyewear, and to fit the wearer's own glasses.

OPERATION

The operation of the foregoing devices has been explained in connection with an explanation of the structure. Summarizing the operation, the object to be held is placed in proximity to the face of the wearer of eyeglasses, after one or more of the holding devices have been placed over the frame portion of the eyeglasses and the adhesive is prepared for reception. The object is positioned and then pressed against the adhesive. If there are two or more holding devices used, greater stability results. However one holding device will suffice in some cases, depending upon the object to be held. For the purpose of the present invention, the objects fall into a group consisting of display cards, masks, visors and light filters. The word masks is not intended to be limiting, but includes masks of all types, including Halloween masks, decorative Mardi Gras masks, surgical masks, air filtering masks, and protective masks. The word display cards is not meant to be limiting, but includes name tags, business cards, novelty or comic slogan cards and small signs of all types and shapes adapted to receive messages, advertising names or other indicia thereon. Light filters includes darkened, colored or polarizing plastic sheets. Visors includes sun visors and novelty advertising visors or plastic, cardboard, cloth or heavy paper.

While there has been described preferred embodiments and several modifications, it is desired to secure in the appended claims all modifications which fall within the true spirit and scope of the invention.

I claim:

1. Device for positioning and holding an object in close proximity to the face of a wearer of eyeglasses, the eyeglasses having a pair of lens and having frame portions encasing the edges of said lens, said device comprising:

a channel member of flexible plastic material having a base and two spaced sidewalls extending from the base and having terminating edges, the spacing between said sidewalls proximal to the base having a first dimension sufficient to receive said eyeglass frame portion, the spacing between the sidewalls distal to the base being of a second dimension lesser than the thickness of the eyeglass frame portion for retaining the channel member on the eyeglass frame portion, and attachment means provided on a first one of said sidewalls and adapted for selective engagement with said object for selectively positioning and holding said object with respect to said face of the wearer.

2. Device according to claim 1, where said attachment means comprises adhesive means attached to the exterior of said first sidewall, and adapted for selective attachment to said object.

3. Device according to claim 2, where the adhesive means comprises a double sided adhesive pad having one side thereof attached to the device sidewall and the other side thereof adapted for selective adhesive attachment to the object.

4. Device according to claim 2, where the adhesive means is a tacky globule of adhesive putty.

5. Device according to claim 1, where the terminating edge of at least one of the sidewalls is flared out from the spaced sidewall so as to facilitate placing the device over the frame portion of the eyeglasses.

6. Device according to claim 1, wherein said attachment means comprises an extension of one of said side walls curled around to define a holding channel with the exterior of said sidewall.

7. Device according to claim 1, wherein the second dimension is less than the lens thickness, whereby the sidewalls will flex to grasp the lens.

8. Device according to claim 1, wherein the length of said channel member along its base is greater than its height in a direction perpendicular to the base.

9. Device according to claim 2, wherein the ratio of length to height is approximately 3:2.

10. Combination of an object to be held in close proximity to the face of a wearer of eyeglasses, the eyeglasses having a pair of lens and having frame portions encasing the edges of said lens, and a device for holding the object, the combination comprising:

an object selected from a group consisting of masks, visors, light filters and display cards, said object having a surface facing the wearer, and at least one device adapted to hold the object, the device comprising a channel member of flexible plastic material having a base and two spaced sidewalls extending from the base and having terminating edges, the spacing between said legs proximal to the base having a first dimension sufficient to receive said eyeglass frame portion, the spacing between the sidewalls distal to the base being of a second dimension lesser than the thickness of the eyeglasses frame portion for retaining the channel member on the eyeglasses frame portion, and adhesive means disposed on the exterior of one of said sidewalls and adapted for selective attachment to said surface of said object for selectively positioning and holding said object with respect to said face of the wearer.

11. The combination according to claim 10, wherein there are a pair of said devices, each arranged to fit over the frame portion of one of said lens.

12. The combination according to claim 10, wherein the object comprises a display card adapted for placement of indicia thereon and having a support leg adapted to be attached to the adhesive means.

13. The combination according to claim 10, wherein the object is a mask having portions covering the lens of the eyeglasses.

14. The combination according to claim 13, wherein the mask portions covering the lens have eye openings whereby the adhesive means may hold the mask so that the eye openings are aligned with the eyes of the wearer.

15. The combination according to claim 10, wherein the object is a visor and wherein the visor has an extending front portion, whereby the adhesive means may hold the visor for shading the eyes of the wearer.

16. The combination according to claim 10, wherein the object is a light filter comprising a transparent sheet shaped to cover the pair of lens to modify the light passing therethrough and whereby the adhesive means holds the transparent sheet positioned with respect to the lens.

17. Device according to claim 10, where the adhesive means comprises a double sided adhesive pad having one side thereof attached to the device sidewall and the other side thereof adapted for selective attachment to the object.

18. Device according to claim 10, where the adhesive means is a tacky globule of adhesive putty.

19. Device according to claim 10, where at least one of the terminating edges of the sidewalls is flared out from the spaced sidewall so as to facilitate placing the device over the frame portion of the eyeglasses.

20. Device according to claim 10, wherein the second dimension is less than the lens thickness, whereby the sidewalls will flex to grasp the lens.

* * * * *